Dec. 15, 1953    J. HENDRIX    2,662,613
SKID DEVICE FOR UNLOADING TRUCKS
Filed Feb. 23, 1951    2 Sheets-Sheet 1

INVENTOR.
JOY HENDRIX
BY
John H. Cassidy
ATTORNEY

Dec. 15, 1953  J. HENDRIX  2,662,613
SKID DEVICE FOR UNLOADING TRUCKS
Filed Feb. 23, 1951  2 Sheets-Sheet 2
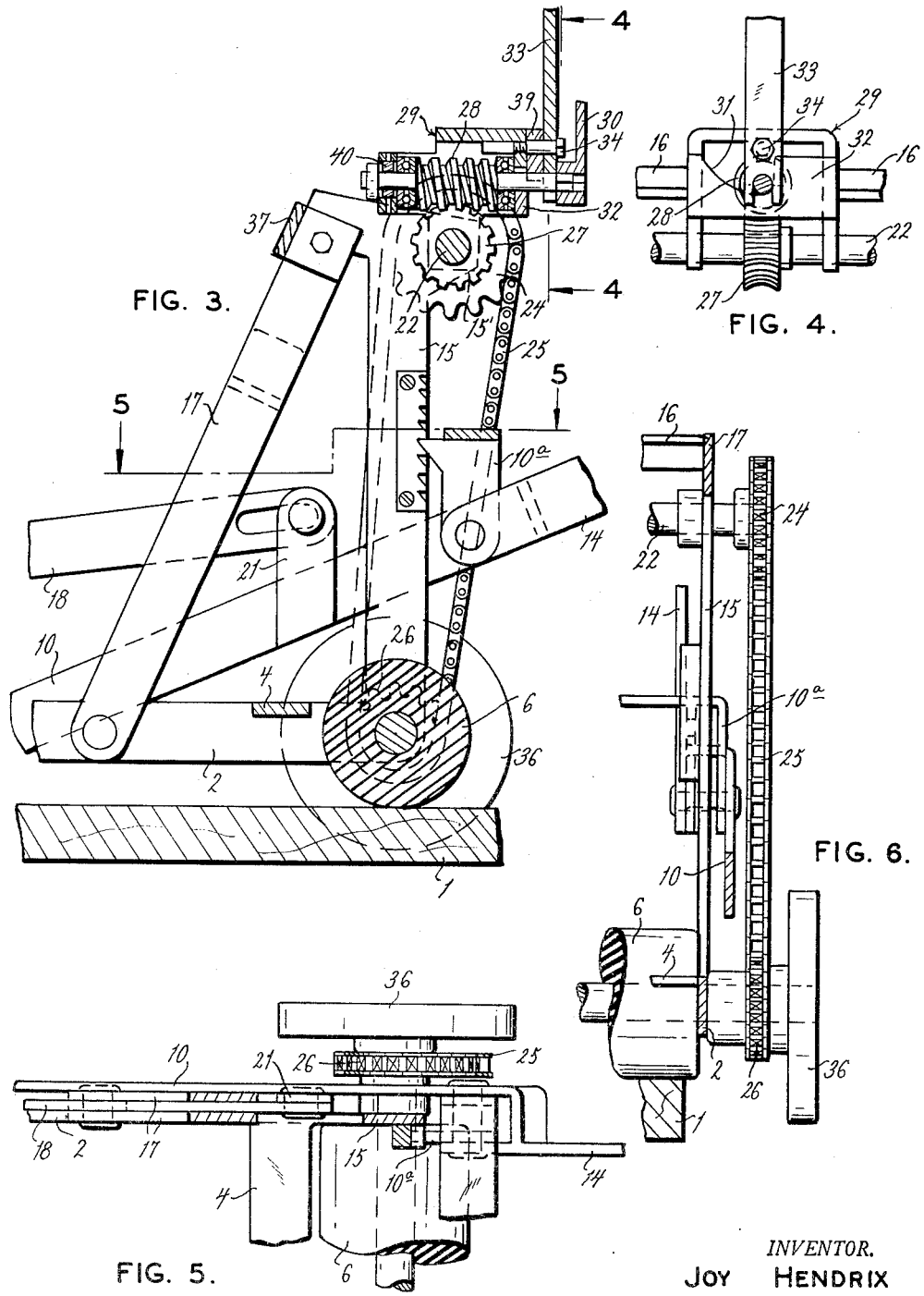
INVENTOR.
JOY HENDRIX
BY
ATTORNEY Patented Dec. 15, 1953

2,662,613

UNITED STATES PATENT OFFICE 2,662,613

SKID DEVICE FOR UNLOADING TRUCKS

Joy Hendrix, Kirkwood, Mo.

Application February 23, 1951, Serial No. 212,330

3 Claims. (Cl. 187—10)

This invention pertains to a device for loading and unloading heavy articles from trucks with the assistance of a so-called skid board placed with one end on the truck and the other on the ground, or on a loading platform to which the goods is to be delivered.

The main purpose of this invention is to provide a device whereby heavy articles may be handled conveniently and safely without requiring too great a physical effort on the part of the operator.

The device comprises generally a dolly consisting of a frame and a pair of rollers adapted to roll on the skid board. A friction roller usually of rubber, or having a thick rubber coating, is suspended from the dolly so that it may be placed beneath the skid board. A lever mechanism is provided by which the operator may apply a leverage between the friction roller beneath the skid board and the two rollers on the frame of the dolly. By controlling this pressure, the operator may control the amount of friction available to retard the travel of the dolly along the board. The device may further be provided with a load support which is flexibly mounted on the frame of the dolly and connected to the lever mechanism so that when the load is placed thereon, its weight will operate to apply the leverage mentioned above. Means are also provided for controlling the rotation of one of the dolly rollers either by retarding it or by driving it so that the load may be moved along the board in either direction as desired.

A preferred embodiment of the invention is illustrated in the accompanying drawings, in which Fig. 1 is a side view of a skid device embodying this invention;

Fig. 3 is a partial section, further enlarged, on line 3—3 of Fig. 2;

Fig. 4 is a detail section on line 4—4 of Fig. 3;

Fig. 5 is a detail section on line 5—5 of Fig. 3;

Fig. 6 is an enlarged detail section on line 6—6 of Fig. 1;

Figure 1:
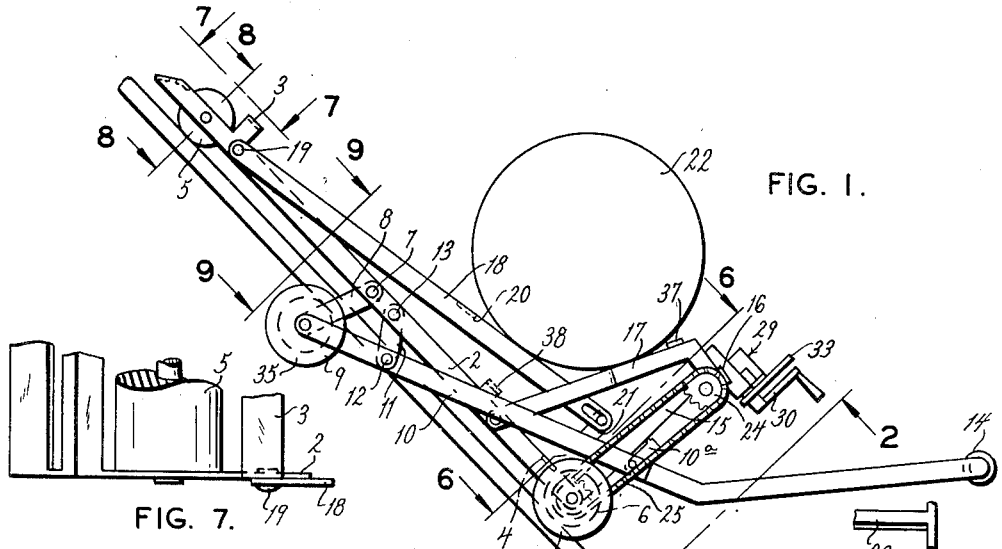
Figures 7, 8, 9:
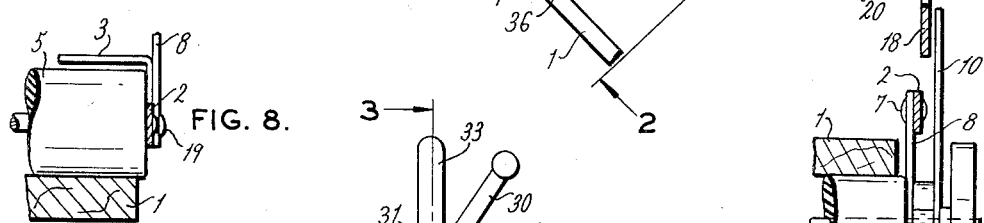
Fig. 7 is a detail section on line 7—7 of Fig. 1.
Fig. 8 is a detail section on line 8—8 of Fig. 1.
Fig. 9 is a detail section on line 9—9 of Fig. 1.
Figure 2:
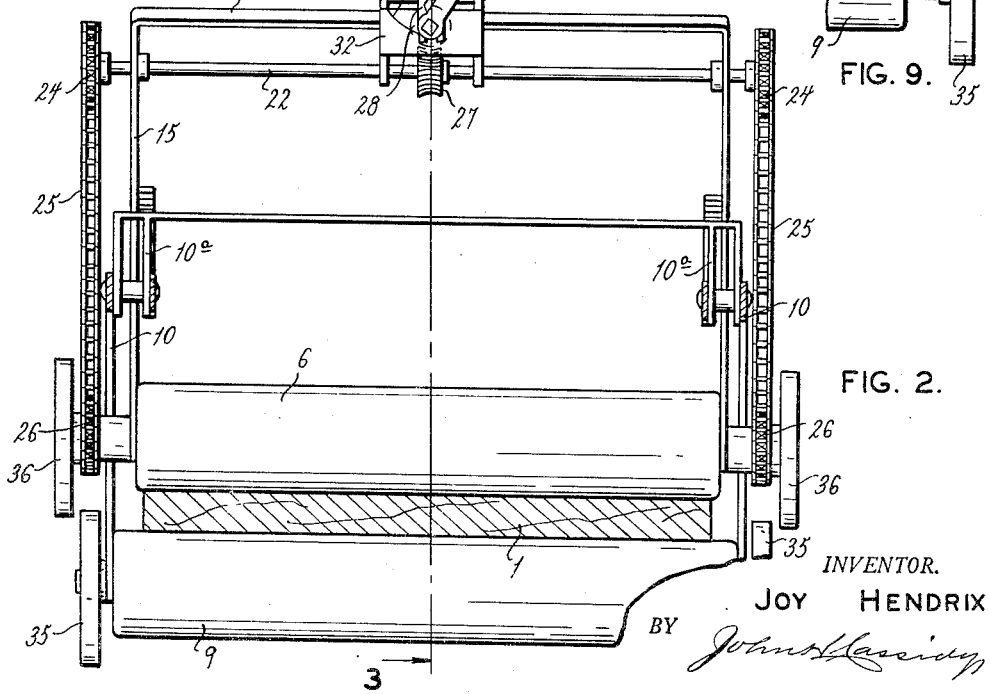
Fig. 2 is an enlarged rear view of the same taken about on line 2—2 of Fig. 1.

Referring now to the drawing, 1 designates the skid board which in Fig. 1 is shown in the position it would assume with one end on the truck body and the other on the ground. The dolly comprises a frame having side members 2 and cross members 3 and 4. A pair of rollers 5 and 6 is provided one at each end of the frame to support the same for movement along the board 1.

Pivoted to said frame at 7 is a link 8 which carries at its lower end a friction roller 9. As stated above, this roller is preferably constructed of resilient material, such as rubber, and fairly hard so that when put under pressure it offers considerable frictional retardation against rolling it along the board. A duplicate link on the other frame member 2 supports the opposite end of the roller. Also connected to the links 8 at the journals of the roller 9 is a pair of lever bars 10. These bars are additionally supported by a pair of links 11 pivoted at 12 to said bars and at 13 to the side bars 2 of the frame. The rear ends of the lever bars 10 are connected by a handle bar 14 for manipulation by the operator. The links 11 and the pivots 12 provide a fulcrum support for the lever bars 10 so that downward pressure on the handle bar 14 will provide a leverage acting through said bars 10 to press the roller 9 upward against the bottom of the board 1. Thus, by varying the pressure on the handle bar 14, the operator may control the frictional resistance offered by the roller 9.

At the rear end of the dolly frame, a pair of uprights 15 is secured to the frame and joined at their upper ends by a cross member 16. The uprights 15 are braced by angle members 17 secured at their lower ends to the side bars 2 and braced by the cross member 37. This upright structure provides an end abutment to hold the load against sliding off of the dolly, and also acts as a guard for the worm gear device. A movable load support is formed by a pair of side bars 18 pivoted at 19 to the side bars 2 and braced by one or more cross members 20. This load support is, therefore, movable on the pivots 19 with respect to the frame 2. The rear ends of the bars 18 are connected by pin-and-slot connections to short uprights 21 welded to the lever bars 10. A locking pawl 10a pivoted on the lever 10 may be arranged to engage teeth on the upright 15 to maintain the leverage once it has been applied. Lugs 38 on the side bars 2 provide stops for the load support in its lowermost position.

It will be seen by this arrangement that when a load, such as a barrel, indicated at 22 is placed on the load support, the weight of the load acting through the posts 21 effects a downward force on the lever bars 10, thereby causing the same to exert an upward pressure on the roller 9 so that the weight of the load automatically applies the pressure to produce a frictional retardation against movement of the whole apparatus downward along the board 1. The pressure on the roller 9 may be increased or diminished by the operator by suitable manipulation of the handle bar 14, so that he may control the amount of retardation and, therefore, the speed of travel of the dolly along the board 1.

Additional control of the movement of the dolly is provided by mechanism for controlling the rotation of one of the rollers, in this case, the roller 6. A cross shaft 22 is journalled in brackets 15' on the side uprights 15. The ends of this shaft are provided with sprockets 24 connected by chains 25 to sprockets 26 on the shaft of the roller 6. Intermediate the ends of the shaft 22, a worm wheel 27 is fixed. It is engaged by a worm 28 journalled in a bracket 29 suitably supported on the cross member 16. The shaft of the worm 28 is connected to suitable manipulating means, such as a crank 30. The shaft of the worm 28 is flexibly journalled at one end in a bearing 40. The other end rests on a cam face 31 formed on a plate 32 on the bracket 29, and is contained in the forked end of a lever 33 pivoted at 34 on the bracket 29. A bearing block 39 on the lever 33 provides additional bearing area. By swinging the lever 33 on its pivot 34, one bearing of the worm 28 may be moved aside with respect to the worm wheel 27 so as to disengage the worm from the worm wheel in order to render this control mechanism inoperative and permit the roller 6 to turn freely. When, however, the worm 28 is in engagement with the worm wheel 27, operation of the crank 30 will cause rotation of the roller 6 in one direction or the other, so that the load may be moved up or down along the board 1.

This arrangement may be used for hoisting heavy loads from the ground to the truck or by operating the same in reverse to let down a heavy load slowly enough so that it may be safely handled during that travel. During such operation, the weight of the load acts through the load carrier 18 and the lever mechanism to increase the pressure on the traction roller 6, and that pressure may be additionally manipulated by the operator by the use of the handle bar 14. Where it is unnecessary to provide for moving the load upward along the board 1, other forms of retarding devices, such as an ordinary brake, may be provided on the shaft 22 in place of the worm mechanism described above.

In order that the dolly may be rolled along the ground upon reaching the lower end of the board 1, road wheels 35 may be provided on the axle of the roller 9 and similar wheels 36 on that of the roller 6.

It will be seen that this invention provides a simple apparatus whereby the handling of heavy loads to be unloaded from trucks may be carried out with safety by a single operator as the movement of the load is under complete control at all times.

Various changes may be made in the details of construction, within the scope of the appended claims, without departing from the spirit of this invention. Parts of the invention may be used without the whole and improvements may be added while retaining some or all of the advantages of the invention.

I claim:
1. A device of the character described for loading and unloading heavy articles from trucks and the like, comprising, a dolly having a frame mounted on rollers adapted to roll on a skid-board, a resilient friction roller suspended from said frame so as to be positionable beneath the skid-board, lever mechanism connected to said friction roller operable to apply pressure against the skid-board between said frame rollers and said friction roller, whereby compression of said resilient roller may vary the frictional retardation offered thereby a load support flexibly mounted on said frame and connected to said lever mechanism to operate the same by the weight of the load on said support, and mechanism on said frame operable to control the rotation of one of said frame rollers.

2. A device of the character described for loading and unloading heavy articles from trucks and the like, comprising, a dolly having a frame mounted on rollers adapted to roll on a skid-board, a resilient friction roller suspended from said frame so as to be positionable beneath the skid-board, lever mechanism connected to said friction roller operable to apply pressure against the skid-board between said frame rollers and said friction roller, whereby compression of said resilient roller may vary the frictional retardation offered thereby, and mechanism on said frame connected to one of the rollers thereon and operable selectively to cause or retard rotation of that roller.

3. A device of the character described for loading and unloading heavy articles from trucks and the like, comprising, a dolly having a frame mounted on rollers adapted to roll on a skid-board, a friction roller suspended from said frame so as to be positionable beneath the skid-board, lever mechanism connected to said friction roller operable to apply pressure against the skid-board between said frame rollers and said friction roller, and ground wheels mounted coaxially with certain of said rollers to support said dolly for rolling on the ground.

JOY HENDRIX.

References Cited in the file of this patent

UNITED STATES PATENTS

| Number | Name | Date |
| --- | --- | --- |
| 638,565 | Doyle | Dec. 5, 1899 |
| 840,283 | Adams et al. | Jan. 1, 1907 |
| 1,021,898 | Shafto | Apr 2, 1912 |
| 2,107,465 | Borggaard | Feb. 8, 1938 |
| 2,234,255 | Hunsaker | Mar. 11, 1941 |
| 2,278,946 | Richard et al. | Apr. 7, 1942 |
| 2,414,447 | Cargile | Jan. 21, 1947 |

FOREIGN PATENTS

| Number | Country | Date |
| --- | --- | --- |
| 28,351 | France | Nov. 6, 1924 |
| | (Addition to No. 546,056) | |
| 647,544 | France | July 31, 1928 |
| 288,117 | Great Britain | Apr. 5, 1928 |